W. H. SMITH.
Bag-Holders.
No. 156,506. Patented Nov. 3, 1874.
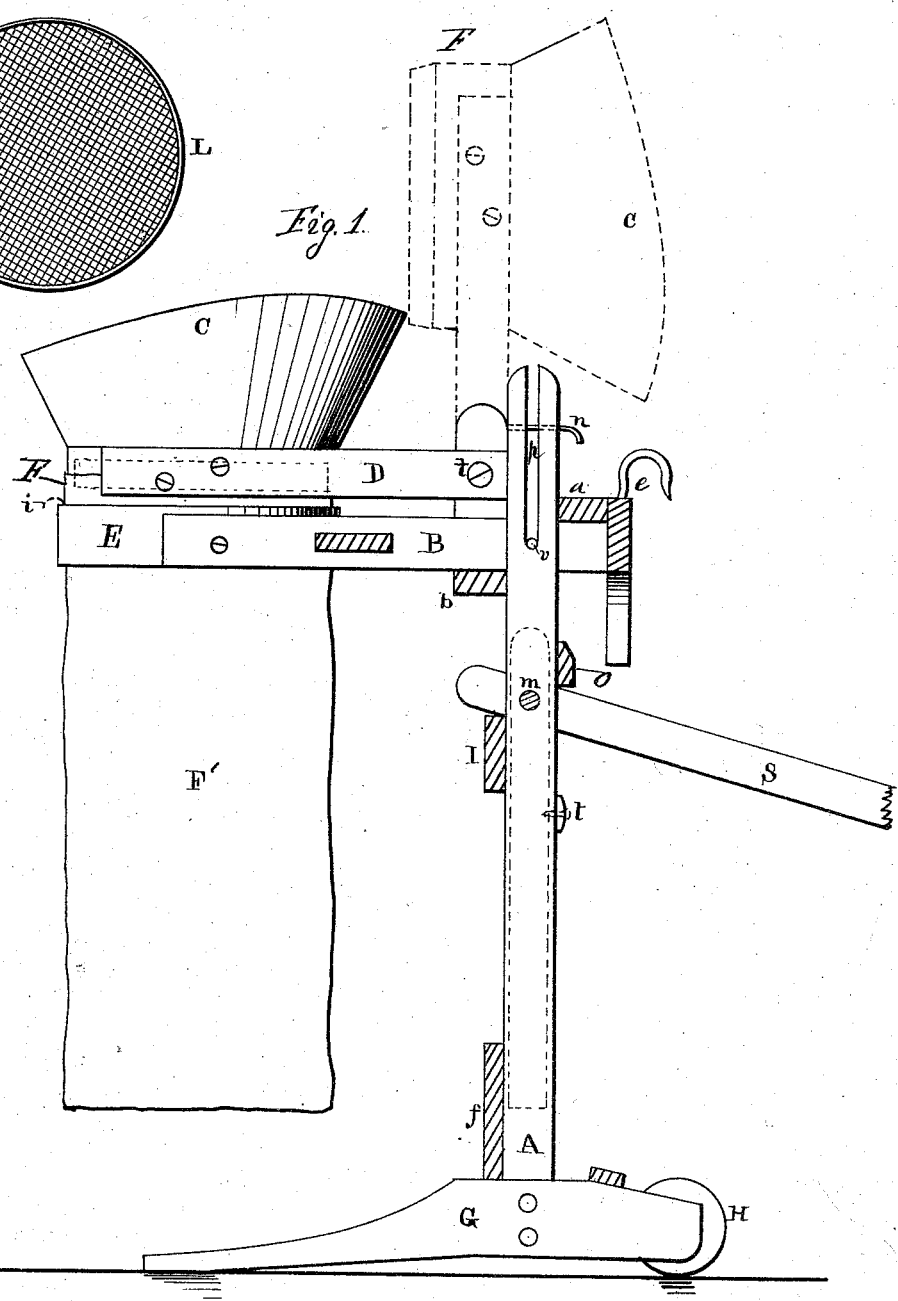
Witnesses,
John H. Gott
Andrew J. McMahon
Inventor,
William H. Smith

UNITED STATES PATENT OFFICE.

WILLIAM H. SMITH, OF ANN ARBOR, MICHIGAN.

IMPROVEMENT IN BAG-HOLDERS.

Specification forming part of Letters Patent No. 156,506, dated November 3, 1874; application filed July 19, 1873.

*To all whom it may concern:*

Be it known that I, WM. H. SMITH, of Ann Arbor, in the county of Washtenaw and State of Michigan, have invented certain new and useful Improvements in Bag-Holders; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

Figure 1 is a side elevation of my improved apparatus, and Fig. 2 is a plan view of the sieve detached.

The present invention is an improvement upon the bag-holder patented to me July 31, 1866.

The apparatus consists of an upright frame, A, having cross-bars I and $f$, secured to horizontal foot-pieces G, in one end of which are secured rollers H, their opposite ends being tapered, so as to form handles, by which the apparatus as a whole can be moved about upon the rollers or wheels H. To the upright frame A is pivoted, on each side, a brace, S, which can be swung out at the bottom until they strike against a cross-bar, $o$, as represented in Fig. 1, when they are rendered rigid, so that, by tipping the device over until these braces rest on the ground or floor, it will be held in an inclined position, so that the grain can be shoveled into the open end of bag without lifting it so high as when standing upright. On each of the upright bars of the frame A is pivoted a button, $t$, for securing the swinging braces S in place, as represented in dotted lines, when not in use.

The horizontal frame, which supports the bag and the hopper, is constructed in the same manner as in my former patent, the bars B having secured at their outer ends a hoop, E, to receive the bag, and having cross-bars $a$ and $b$, arranged in such a manner as to render this horizontal frame self-locking upon the frame A, as shown in Fig. 1. It also has journals $v$, which fit in slots in the upright A; and there are pins $n$ passing transversely through holes in the uprights, by which the horizontal frame may be held at any required height by raising the frame B and inserting the pins $n$ under the journals $v$.

The hopper C is secured to bars D, which are pivoted at their rear ends at $t$, so as to allow it to be turned up, as shown in dotted lines in Fig. 1. The hopper is provided with a hoop or band, F, at its lower end, which is made slightly conical, and of such a size as to fit within the hoop E after the bag F' has been inserted therein, this band F shutting down within the open mouth of the bag, and holding it fast between it and the hoop E, the end of the bag protruding up through the hoop E, as indicated at $i$, Fig. 1.

For the purpose of preventing straws and similar substances, which occasionally get mixed with the grain after being cleaned, from entering the sack, I provide a sieve or screen, L, as represented in Fig. 2, of such a size as to fit within the mouth or lower portion of the hopper C, as indicated by dotted lines in Fig. 1. This sieve is made slightly conical, or with a rim, as may be preferred, by which it is held securely in the hopper, so that, when the latter is turned up, after a bag is filled, the straw, &c., retained by the sieve in the hopper will be thrown out.

When the bag-holder is used in an inclined position, the sieve L is taken out.

Having thus described my invention, what I claim is—

1. The hinged hopper C, provided with the flange F, constructed and arranged to shut within the bag-supporting hoop E, substantially as described.

2. A bag-holder having the hinged hopper, provided with the screen and hoop, all constructed to operate substantially as described.

In witness whereof I, the said WILLIAM H. SMITH, have hereunto set my hand and seal this 14th day of July, 1873.

WILLIAM H. SMITH. [L. S.]

In presence of—
JOHN N. GOTT,
ANDREW J. MCMAHON.